(12) United States Patent
Bagg et al.

(10) Patent No.: US 11,461,357 B2
(45) Date of Patent: Oct. 4, 2022

(54) DATA CONVERSION BULK VALIDATION AUTOMATED FRAMEWORK

(71) Applicant: BANK OF AMERICA CORPORATION, Charlotte, NC (US)

(72) Inventors: Howard Bagg, Richardson, TX (US); Mathangi Pichai, Frisco, TX (US); Justin Charles Taylor, Plano, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 57 days.

(21) Appl. No.: 16/937,187

(22) Filed: Jul. 23, 2020

(65) Prior Publication Data

US 2022/0027382 A1 Jan. 27, 2022

(51) Int. Cl.
*G06F 16/25* (2019.01)
*G06F 16/18* (2019.01)
*G06F 40/151* (2020.01)
*G06F 16/28* (2019.01)

(52) U.S. Cl.
CPC .......... *G06F 16/258* (2019.01); *G06F 16/284* (2019.01); *G06F 40/151* (2020.01)

(58) Field of Classification Search
CPC ..... G06F 16/258; G06F 16/284; G06F 40/151
USPC ........................................................ 707/756
See application file for complete search history.

(56) References Cited

U.S. PATENT DOCUMENTS

| | | | |
|---|---|---|---|
| 7,536,634 B2 | 5/2009 | Green et al. | |
| 8,010,582 B2 | 8/2011 | Zimowski | |
| 8,230,332 B2 | 7/2012 | Summers et al. | |
| 9,105,000 B1 | 8/2015 | White et al. | |
| 9,201,869 B2 | 12/2015 | Ogren et al. | |
| 9,311,301 B1 | 4/2016 | Balluru et al. | |
| 9,430,505 B2 | 8/2016 | Padmanabhan et al. | |
| 9,430,801 B2 | 8/2016 | Bhatt | |
| 9,442,980 B1 | 9/2016 | Trepetin et al. | |
| 9,483,546 B2 | 11/2016 | Erenrich et al. | |
| 9,514,244 B2 | 12/2016 | Hazlewood et al. | |
| 9,547,693 B1 | 1/2017 | Sheasby et al. | |
| 9,740,757 B1 | 8/2017 | Gilder et al. | |
| 9,760,556 B1 | 9/2017 | Knudson et al. | |
| 9,984,428 B2 | 5/2018 | Doyle et al. | |
| 10,114,884 B1 | 10/2018 | Valensi et al. | |
| 10,223,429 B2 | 3/2019 | Michel et al. | |
| 10,552,994 B2 | 2/2020 | Yousaf et al. | |
| 2007/0204211 A1* | 8/2007 | Paxson | G06F 40/131 715/205 |
| 2012/0265726 A1* | 10/2012 | Padmanabhan | G06F 16/214 707/602 |

(Continued)

*Primary Examiner* — Kuen S Lu
(74) *Attorney, Agent, or Firm* — Moore & Van Allen PLLC; Nicholas C. Russell

(57) ABSTRACT

Embodiments of the invention are directed to systems, methods, and computer program products for automating bulk data conversion processes of one or more database management systems. Data conversion projects of focus may comprise conversion of a large bulk of data with a wide range in order of magnitude. The system is designed and driven by the present constraints of large data conversion and is based on principles of reviewability, minimization of manual review and development work, persistence of data stores for data result comparison, process optimization for downstream review and certification, timely execution, and allowance for concurrent development by multiple systems and resources.

17 Claims, 5 Drawing Sheets

(56) References Cited

U.S. PATENT DOCUMENTS

| | | | |
|---|---|---|---|
| 2014/0344715 A1* | 11/2014 | Beerse | G06Q 10/109 715/753 |
| 2015/0134589 A1* | 5/2015 | Marrelli | G06F 16/258 707/602 |
| 2017/0060992 A1 | 3/2017 | Bhide et al. | |
| 2018/0013848 A1* | 1/2018 | Schejter | G06F 16/9535 |
| 2018/0089009 A1 | 3/2018 | Li et al. | |

* cited by examiner

DATA CONVERSION BULK VALIDATION AUTOMATED FRAMEWORK

FIELD

The present invention generally relates to a set of functions, tools, and procedures allowing automation for the validation of database information systems using an operating system, application, or other service across one or more entity systems.

BACKGROUND

Existing data conversion systems, especially in large scale, invariably involve the conversion of one or more large sets of data to be consumed by new, downstream systems. If this data conversion is not accurately performed and comprehensively validated, downstream functionality will not retain a solid foundational strength and confidence, and may lead to unnecessary defects which could compound and result in overall program failure. As such, a solution is required which provides a tool for conversation and validation of a large number of data elements from a multitude of internal and external systems. An ideal solution would provide the functionality to segregate data types by criticality, and possess the ability to complete data validation in a relatively short window of time, at least for most critical items. Identification of populations of data with potential conversion issues is also preferred to avoid overall implementation failure due to unresolved issues downstream. The tool would also require comprehensive controls and enhanced review features given the nature of migration between systems. As such, ability to archive legacy and converted data for future review and investigation is preferred. The ability to track the development lifecycle of data elements, including classification and certification of conversion results is also preferred. Finally, there is an overall need for a solution that is both modular and adaptable so as to provide capability for fine-tuning and solution development for future upgradability.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. Embodiments of the present invention address the above and/or other needs by providing a system for automating the bulk data conversion process of one or more database management systems, even on large scales. Data conversion projects of focus may comprise conversion of a large bulk of data with a wide range in order of magnitude (e.g., projects may include conversion of thousands of records, millions of records, or the like). Embodiments of the invention are directed to systems, methods, and computer program products for streamlining the processes involved with the cohabitation, conversation, review, and delivery of large stores of data. The system is designed and driven by the present constraints of large data conversion and is based on principles of reviewability, minimization of manual review and development work, persistence of data stores for data result comparison, process optimization for downstream review and certification, timely execution, and allowance for concurrent development by multiple systems and resources. The system and process of implementation generally comprises gathering and source target data (e.g., legacy and converted data), loading data into a preconfigured database, capturing required legacy data and generating "shadow" converted data that is a facsimile of the data converted by external systems, development of code needed to implement conversion logic used to generate shadow converted data, generation and execution of developed code to compare shadow converted data to actual converted data, and packaging validation results for downstream review and certification.

In some instances, the system comprises: at least one memory device with computer-readable program code stored thereon, at least one communication device, at least one processing device operatively coupled to the at least one memory device and the at least one communication device, wherein executing the computer-readable program code is typically configured to cause the at least one processing device to perform, execute or implement one or more features or steps of the invention.

Embodiments of the invention relate to systems, computer implemented methods, and computer program products for automation of bulk data conversion, generally comprising the steps of receive a request from a user via a user device to initiate a conversion project; generate and store a conversion project data file for the conversion project on a shared datastore, wherein the shared datastore comprises a datastore accessible via remote access over a network; receive source data for conversion; generate a relational database conversion template based on the received source data; execute the relational database conversion template to generate a peer review data package; upload the peer review data package to the shared datastore; grant access to the peer review data package to one or more peer users; revise the relational database conversion template based on input received from the one or more peer users; execute a revised relational database conversion template to generate a converted data package; and upload the converted data package for access by one or more downstream users.

In some embodiments, generating the relational database conversion template further comprises generating a pre-populated relational database management conversion script based on one or more fields contained in the source data.

In some embodiments, the source data further comprises data to be converted, a definition document defining one or more data fields or conversion rules, and a data conversion validation file.

In some embodiments, the peer review data package further comprises a shadow table, wherein the shadow table displays a system version of sourced versus converted data and a summary of discrepancies between source data and converted data.

In some embodiments, the converted data package further comprises a spreadsheet file summarizing the bulk data conversion.

In some embodiments, the converted data package further comprises a spreadsheet file with one or more hyperlinks to relational database management conversion code and one or more data definitions.

In some embodiments, the shared datastore is continuously updated to reflect the status of the conversion project.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
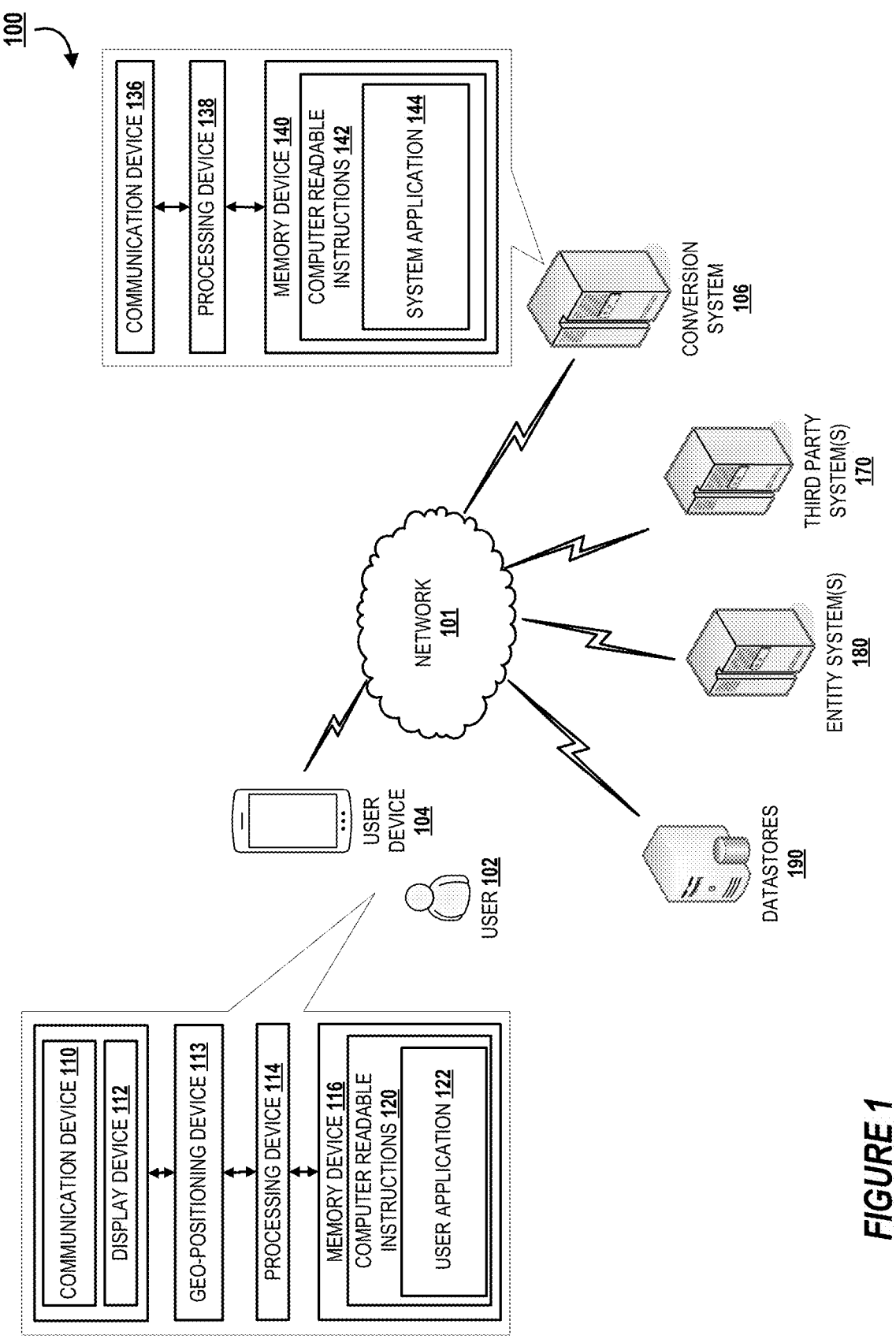
Figure 2:
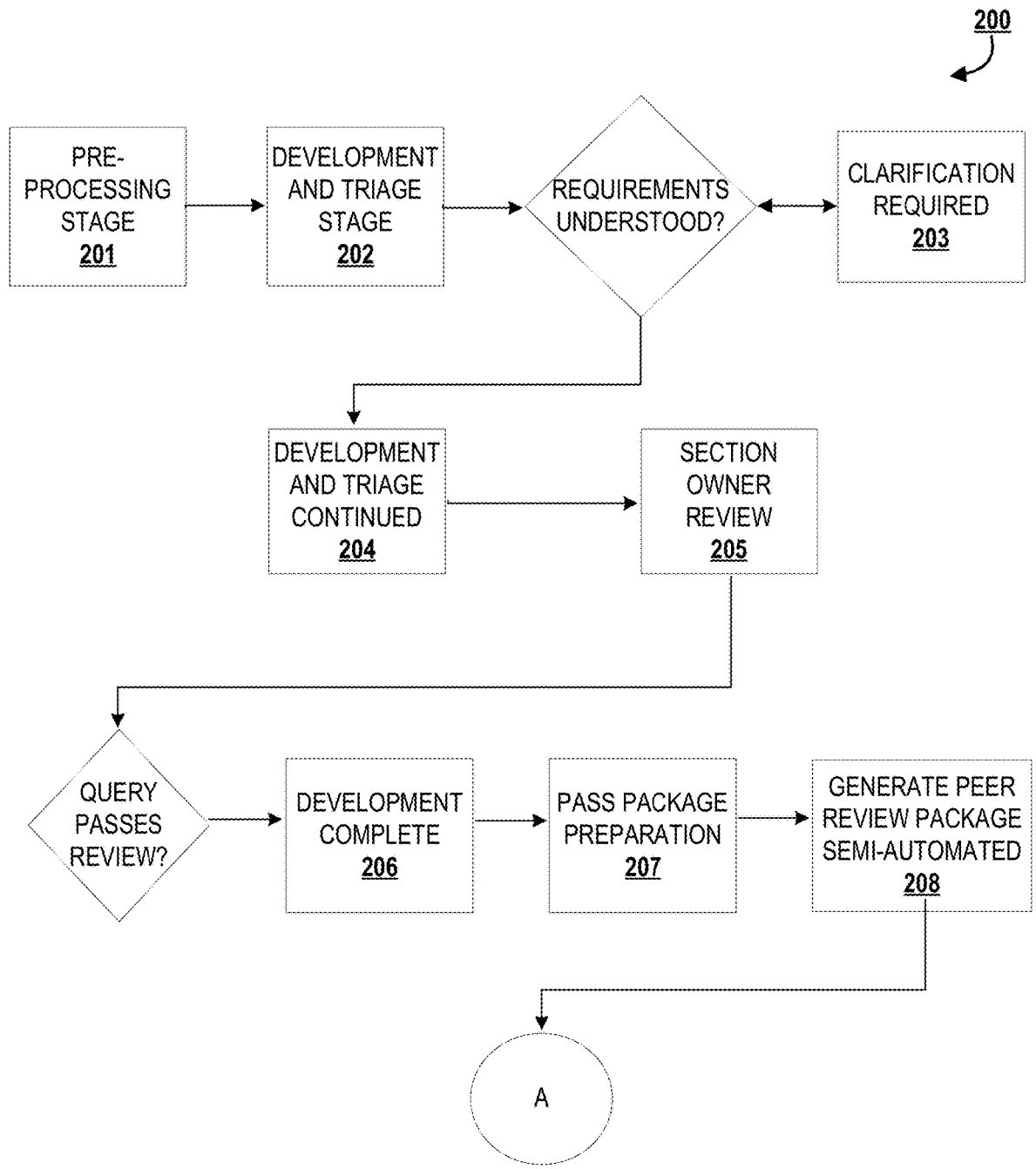
Figure 3:
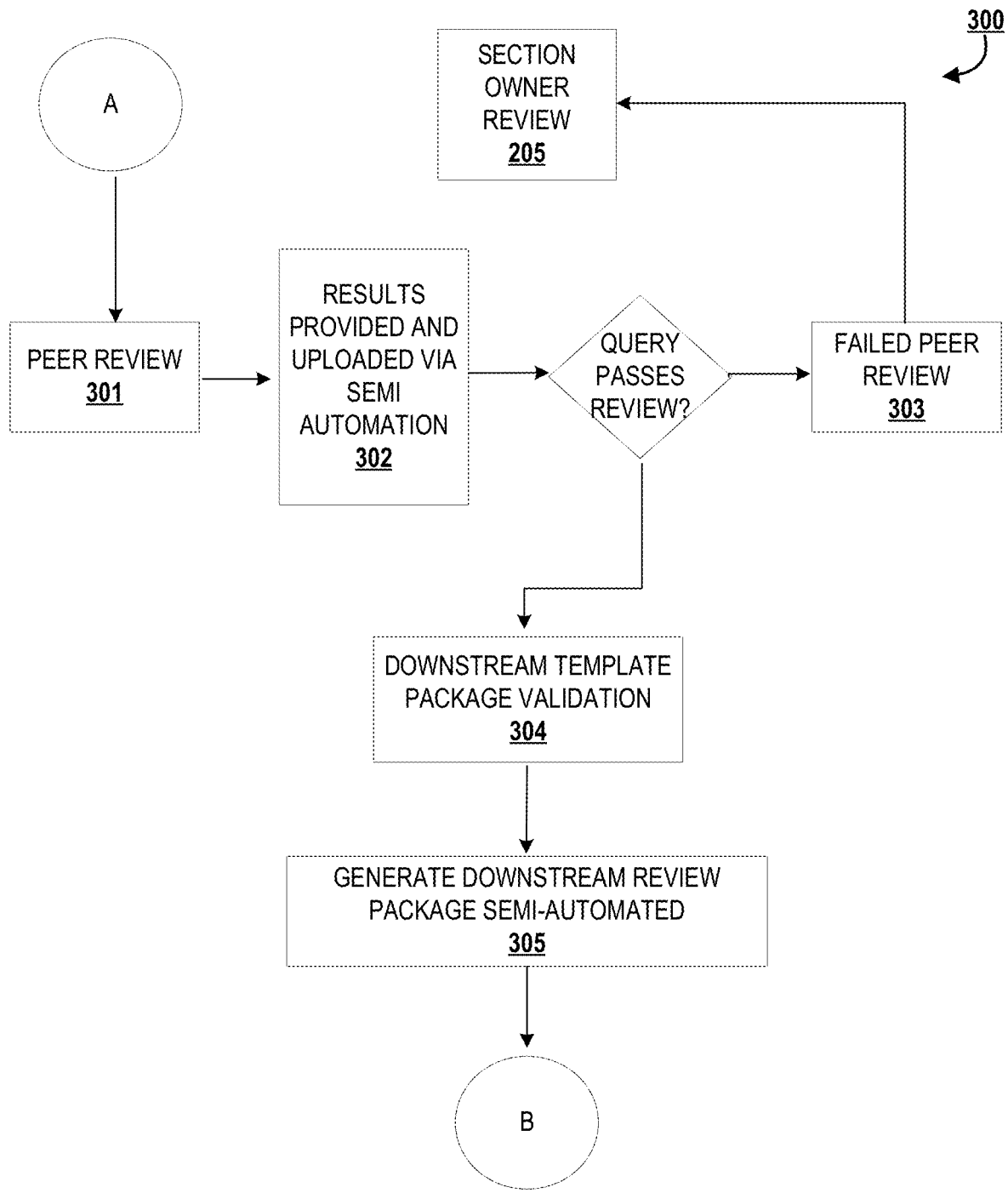
Figure 4:
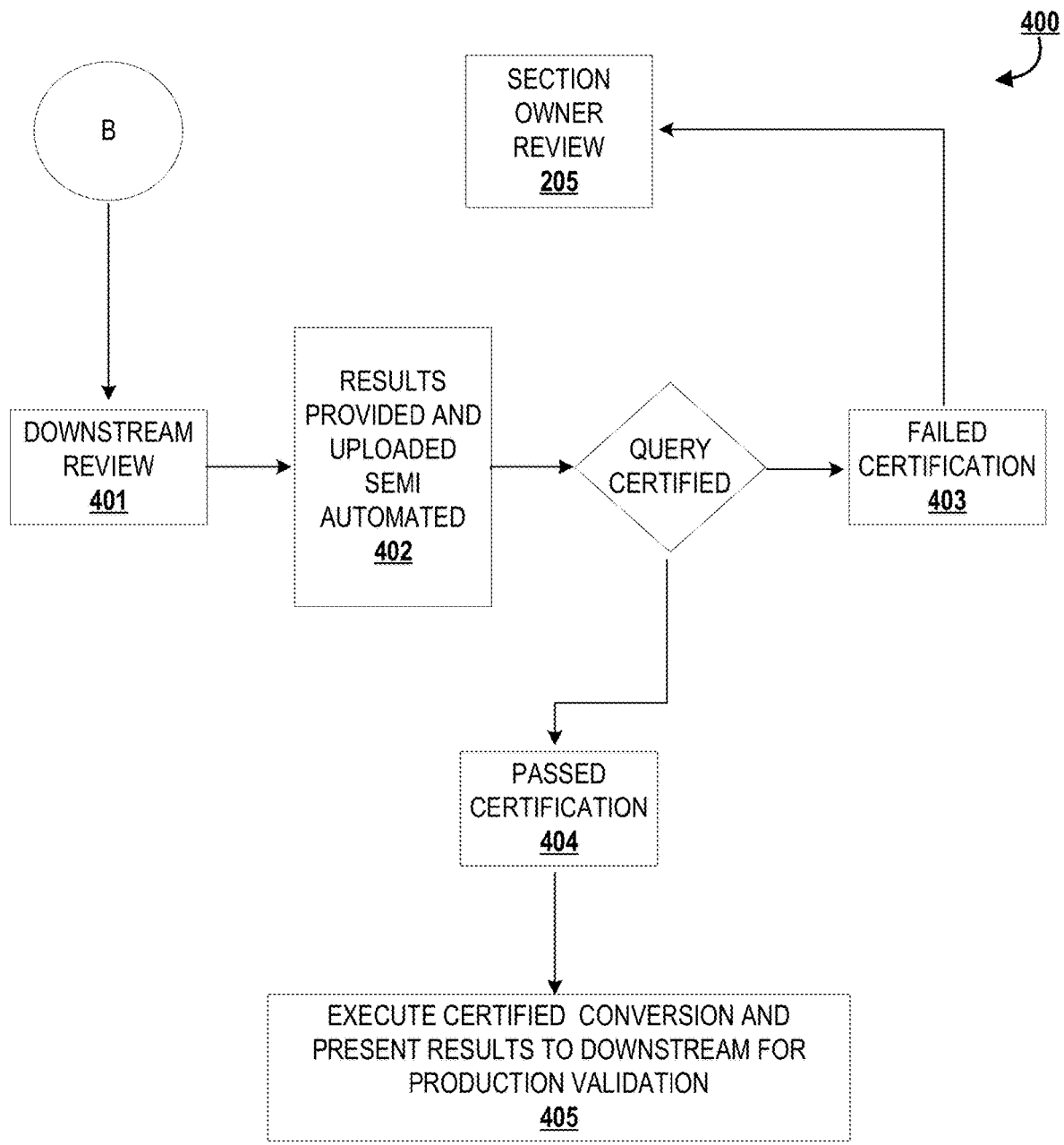
Figure 5:
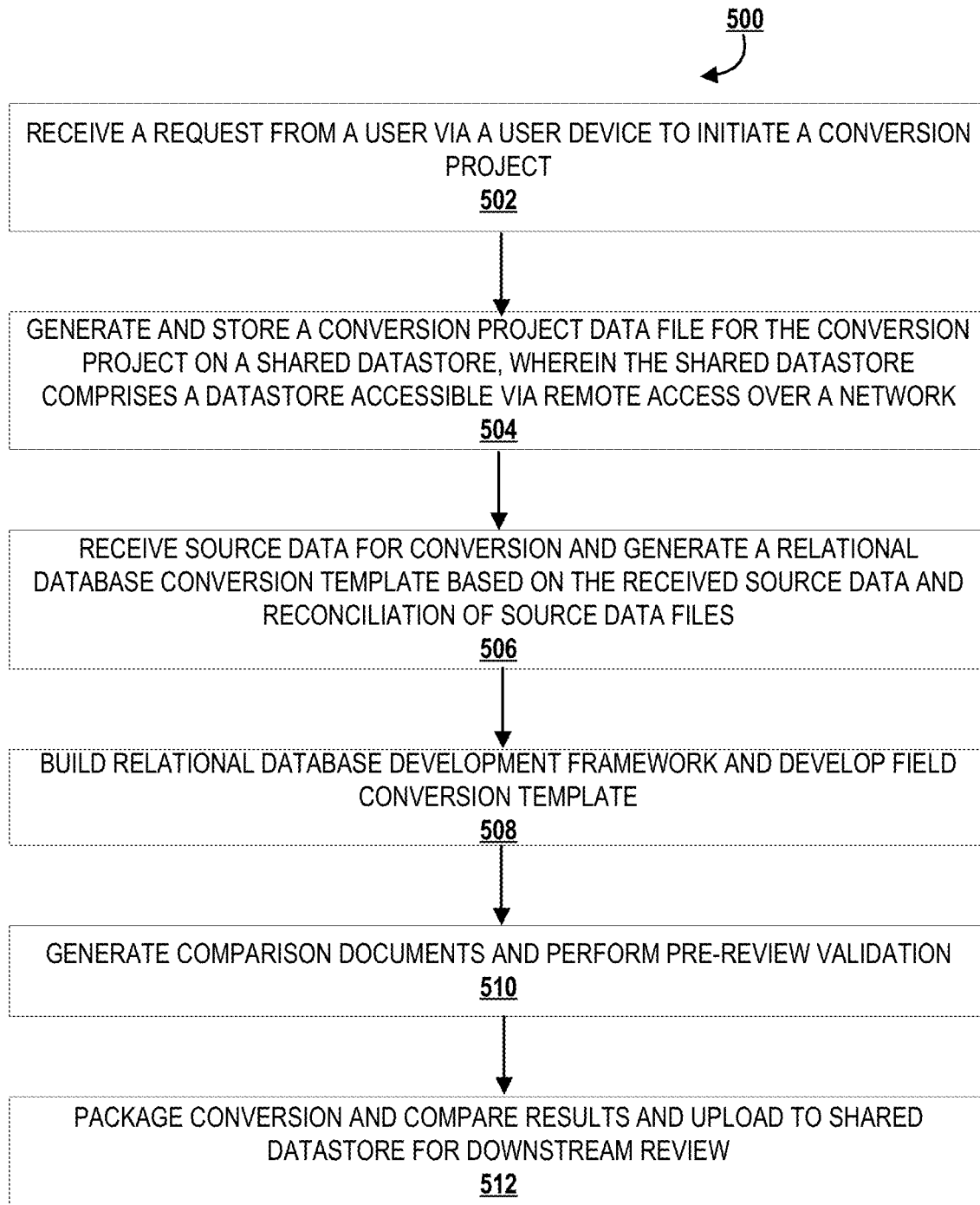

Having thus described embodiments of the invention in general terms, reference will now be made to the accompanying drawings, wherein:

FIG. 1 depicts a platform environment 100 providing a system for automated bulk data conversion, in accordance with one embodiment of the present invention;

FIG. 2 depicts a high level process flow diagram 200 for system tool initiation and generation of a peer review package, in accordance with one embodiment of the present invention;

FIG. 3 depicts a process flow diagram 300 for utilizing system tools for peer review and data flow for downstream review package generation and validation, in accordance with one embodiment of the present invention;

FIG. 4 depicts a process flow diagram 400 for utilizing system tools for downstream review and data flow for review certification, in accordance with one embodiment of the present invention; and FIG. 5 depicts a high level process flow 500 for system tool utilization for bulk conversion, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment. As such, the entity may be any institution, group, association, financial institution, merchant, establishment, company, union, authority or the like.

As described herein, a "user" is an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein. In accordance with embodiments of the invention, the term "user" may refer to an authorized person, business or the like, who utilizes an external apparatus such as a user device, for accessing systems and tools described herein. The external apparatus may be a user device (computing devices, mobile devices, smartphones, wearable devices, and the like). In some embodiments, the user may seek to perform one or more user activities using a web-based application accessed via the user device web browser or in some embodiments may perform one or more user activities using a locally stored application on the user device to interact with the system of the invention. In some embodiments, the user may perform a query by initiating a request for information from the entity systems or various databases using the user device to interface with the system to configure, test, or review system data conversions, tools, or ongoing conversion projects.

In the instances where the entity is a resource entity or a merchant, financial institution and the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution.

A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, or the like. The technology resource or account is typically associated with and/or maintained by an entity, and is typically associated with technology infrastructure such that the resource or account may be accessed, modified or acted upon by the user electronically, for example using or transaction terminals, user devices, merchant systems, and the like. In some embodiments, the entity may provide one or more technology instruments or financial instruments to the user for executing resource transfer activities or financial transactions. In some embodiments, an entity may be any institution, group, association, club, establishment, company, union, authority or the like with which a user may have a relationship. As discussed, in some embodiments, the entity represents a vendor or a merchant with whom the user engages in financial (for example, resource transfers like purchases, payments, returns, enrolling in merchant accounts and the like) or non-financial transactions (for resource transfers associated with loyalty programs and the like), either online or in physical stores.

As used herein, a "user interface" may be a graphical user interface that facilitates communication using one or more communication mediums such as tactile communication (such, as communication via a touch screen, keyboard, and the like), audio communication, textual communication and/or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems and the like. In some embodiments, the graphical user interface may be presented in a different configuration depending on the user or type of user that accesses it. In some embodiments, the graphical user interface may be a component of a web-based application that the user may access remotely over a network or a secure virtual private network, secure socket layer, and the like.

Embodiments of the invention are directed to systems, methods, and computer program products for streamlining the processes involved with the conversion of large stores of data between multiple data management system components. The system is further configured to automate the performance of data review. Furthermore, the system is configured to automate the production of conversion code, launch command line interface on a user device, connect to target database components, retrieve necessary information, and automatically detect relational database management software capabilities and requirements. During the system processes, the system is designed to automatically performs pre-validation tasks and generate backup script files in chronological order.

FIG. 1 depicts a platform environment 100 providing a system for automated bulk data conversion, in accordance with one embodiment of the present invention. As illustrated in FIG. 1, a conversion system 106 is configured for providing an application or web application interface accessible by a user 102 via user device 104. The conversion system 106 is operatively coupled, via a network 101 to one or more user devices 104, to entity systems 180, datastores 190, and other external systems/third-party servers such as third party system(s) 170. In this way, the conversion system 106 can send information to and receive information from multiple user devices 104 to provide an integrated platform and data access to a user 102. At least a portion of the system is typically configured to reside on the user device 104 (for example, at the user application 122), on the conversion system 106 (for example, at the system application 144), and/or on other devices and systems such as the entity systems 180 and is a responsive system that facilitates execution of database configurations and version management. In some embodiments the system tools and functions are utilized by a database administrator in order to perform a data conversion of entity data provided by one or more entity system(s) 180, third party system(s) 170, or other systems not shown herein. In further embodiments, the database administrator may utilize tools and systems of the present invention in order to perform analysis services, server reporting services, data integration services, or the like.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the user 102 is an individual that wishes to conduct one or more activities with conversion system 106 using the user device 104. In some embodiments, the user 102 may access the conversion system 106, and/or the entity system 180 through a user interface comprising a webpage or a user application. Hereinafter, "user application" is used to refer to an application on the user device 104 of the user 102, a widget, a webpage accessed through a browser, and the like. As such, in some instances, the user device may have multiple user applications stored/installed on the user device 104 and the memory device 116 in particular. In some embodiments, the user application is a user application 122, also referred to as a "user application" 122 herein, provided by and stored on the user device 104 by the conversion system 106. In some embodiments the user application 122 may refer to a third party application or a user application stored on a cloud used to access the conversion system 106 through the network 101. In some embodiments, the user application is stored on the memory device 140 of the conversion system 106, and the user interface is presented on a display device of the user device 104, while in other embodiments, the user application is stored on the user device 104.

The user 102 may subsequently navigate through the interface, perform one or more searches for database information or initiate one or more activities or data conversions, inventories, or configurations using a central user interface provided by the user application 122 of the user device 104. In some embodiments, the user 102 may be routed to a particular destination using the user device 104. In some embodiments the user device 104 requests and/or receives additional information from the conversion system 106 or the user device 104 for authenticating the user or the user device, determining appropriate queues, executing information queries, executing scripts, initiating downgrade functions, and other system functions.

The user device 104, herein referring to one or more user devices, wherein each device may generally comprise a communication device 110, a display device 112, a geo-positioning device 113, a processing device 114, and a memory device 116. Typically, the user device 104 is a computing system that allows a user 102 to interact with other systems to initiate or to complete activities, resource transfers, and transactions for products, and the like. The processing device 114 is operatively coupled to the communication device 110 and the memory device 116. The processing device 114 uses the communication device 110 to communicate with the network 101 and other devices on the network 101, such as, but not limited to the entity system 180, datastores 190, and the conversion system 106. As such, the communication device 110 generally comprises a modem, server, or other device for communicating with other devices on the network 101. In some embodiments, the processing device 114 may be further coupled to a display device 112, a geo-positioning device 113, and/or a transmitter/receiver device, not indicated in FIG. 1. The display device 112 may comprise a screen, a speaker, a vibrating device or other devices configured to provide information to the user. In some embodiments, the display device 112 provides a presentation of the central user interface of the integrated user application 122. The geo-positioning device 113 may comprise global positioning system (GPS) devices, triangulation devices, accelerometers, and other devices configured to determine the current geographic location of the user device 104 with respect to satellites, transmitter/beacon devices, telecommunication towers and the like. In some embodiments the user device 104 may include authentication devices like fingerprint scanners, microphones and the like that are configured to receive bio-metric authentication credentials from the user.

The user device 104 comprises computer-readable instructions 120 stored in the memory device 116, which in one embodiment includes the computer-readable instructions 120 of the user application 122. In this way, users 102 may authenticate themselves, system tools and functions, communicate with the conversion system 106 to request or transmit information, initiate a data conversion, and/or view analytics data about completed or in-progress data conversions using the central user interface of the user device 104. As discussed previously, the user device 104 may be, for example, a desktop personal computer, a mobile system, such as a cellular phone, smart phone, personal data assistant (PDA), laptop, wearable device, a smart TV, a smart speaker, a home automation hub, augmented/virtual reality devices, or the like. The computer readable instructions 120 such as computer readable/executable code of the user application 122, when executed by the processing device 114 are configured to cause the user device 104 and/or processing device 114 to perform one or more steps described in this disclosure, or to cause other systems/devices to perform one or more steps described herein.

As further illustrated in FIG. 1, the conversion system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the entity systems 180, datastores 190, and/or the user device 104. As such, the communication device 136 generally comprises a modem, server, wireless transmitters or other devices for communicating with devices on the network 101. The memory device 140 typically comprises a non-transitory computer readable storage medium, comprising computer readable/executable instructions/code, such as the computer-readable instructions 142, as described below.

As further illustrated in FIG. 1, the conversion system 106 comprises computer-readable instructions 142 or computer readable program code 142 stored in the memory device 140, which in one embodiment includes the computer-readable instructions 142 of a system application 144 (also referred to as a "system application" 144). The computer readable instructions 142, when executed by the processing device 138 are configured to cause the system 106/processing device 138 to perform one or more steps described in this disclosure to cause out systems/devices (such as the user device 104, the user application 122, and the like) to perform one or more steps described herein. In some embodiments, the memory device 140 includes a data storage for storing data related to user transactions and resource entity information, but not limited to data created and/or used by the system application 144. In the embodiment illustrated in FIG. 1, and described throughout much of this specification, a "system" configured for performing one or more steps described herein refers to the user application 122, that may perform one or more user activities either alone or in conjunction with the conversion system 106, and specifically, the system application 144, and the like. It is understood that entity system(s) 180 and third party system(s) 170 may contain the same or similar communication, processing, memory, and application components and described herein with respect to conversion system 106. In some embodiments, the system application, a copy of the system application, or access to the system application may be stored on or otherwise provided as a service to entity system(s) 180 and third party system(s) 170 using said components. Additionally, it is understood that datastores 190 may represent data in some embodiments provided by or managed by each or all of the conversion system 106, entity system 180, or third party system 170. In some embodiments access to retrieve or manipulate data from datastores 190 may be permissioned such that one or more entities may have differing levels of access and rights with respect to the data stored therein. For instance, conversion system 106 may have read and write permissions, while one or more third party system 170 may only have read-access. In other embodiments, users 102 within the entity systems 180, third party systems 170, and conversion 106 may have tiered, permissioned access as well (e.g., only certain, authorized users may access and manipulate data on conversion system 106 or datastore 190, or the like).

FIG. 2 depicts a high level process flow diagram 200 for system tool initiation and generation of a peer review package, in accordance with one embodiment of the present invention. The system is configured to streamline the processes involved with the conversion of large stores of data between multiple data management system components. The system is further configured to automate the performance of data review. Furthermore, the system is configured to automate the production of sequel (SQL) relational database management conversion code, launch command line interface on a user device (e.g., via a number of computing languages such as Python, or the like), connect to target database components, retrieve necessary information, and automatically detect relational database management software capabilities and requirements. During the system processes, the system is designed to automatically performs pre-validation tasks and generate backup script files in chronological order for storage and viewing on a shared datastore accessible over a networked interface by one or more user devices, entities, or the like.

As depicted in FIG. 2, block 201, the process begins at the pre-processing stage. This step of the process may include updating a shared datastore between multiple entities or users to show that the development has begun. The shared datastore may include importing of unconverted data and creation of a project template to show that development of a SQL conversion template has started. This information in the shared datastore may be viewable by one or more entities, downstream users, line of business representatives, vendors, or the like in various embodiments in order to provide relevant information and track project status over network 101. It is understood that the shared datastore may be accessed via a web application or the like via a user device over network 101, or the like, in order to keep track of information relevant to one or more data conversion projects. Data conversion projects may comprise conversion of a large bulk of data with a wide range in order of magnitude (e.g., projects may include conversion of thousands of data fields, millions of data fields, billions of data fields, or the like). As such, the conversion mechanisms and templates created by system tools may be in various stages of development, internal validation, or external certification. The shared datastore plays a critical role in managing and organizing project metadata such that system users may account for and keep track of project progression through the processes described herein. In addition to being a tool for sharing data, project templates, comments, potential issues, and the like, the shared datastore may act as a project history and development tracking and management tool.

As shown by block 202, the process proceeds to development and triage when a project has been marked as "in development" in the shared datastore, wherein the creation and validation of a SQL generation template takes place. At this point, the system may reconcile a data definition document (DDD) with the shared datastore information and data conversion validation (DCV) files contained in an Oracle database and pre-populate existing SQL templates with relevant data in order to provide a semi-automated process for conversion package creation. In this way, a user need not code a SQL conversion package from scratch. Instead, the system tool may, based on the data provided, pre-populate an existing conversion package template with as much data as possible based on previous projects in order to expedite the process of data conversion and data source. The system or users will then determine if requirements, rules, and data definitions of the data conversion project are understood. If the requirements need clarification, the process will proceed to step 203, wherein required clarification will be obtained from one or more entities involved in the data conversion project (e.g., a system user, business section administrator, third party entity, vendor, line of business contact, or the like may provide insight as to the required or desired fields for data conversion, expected output format, or the like).

If requirements are understood and no discrepancies are identified between the data definition document, shared datastore information, and the data conversion validation (DCV) files contained in the Oracle database, the process proceeds to development and triage continuation, as shown in block 204. At this stage, the system will use available information to build a SQL development framework and develop a field conversion SQL template to gather and convert target data. It is understood that complexity of combining source data is intentionally separated from any complexity involved in converting the source data due to the possibility of data mismatch or project corruption at either of these stages, as well as due to the nature of large amounts of data being sourced and compiled for conversion (e.g., millions of datapoints may be collected and combined prior to conversion, or the like). For instance, conversion of data related to a particular item of interest (e.g., "loan 1," or the like in a database of information regarding various resource accounts and loan balances), may comprise the identifying and compiling of multiple data sources for that single item of interest for combination in a single column of data originating from one or more source columns (e.g., principle resource amount, customer, annual interest rate, or the like may be combined in some way to form a single data point). Capturing this data must be reviewed separately from the generation and validation of converted data. These components are reviewed by a section owner, as shown in 205, in the form of a generated "shadow table" which shows a system version of sourced and converted data in order to easily identify any discrepancies that may arise when collecting the data or converting such data, and deciphering exactly where a potential issues may arise. It is understood that the section owner may be an administrative user, an authorized user, a group of users, or the like, responsible for reviewing and addressing any identified issues, discrepancies, requests, or the like, and generally acting as a means of project oversight when problems may arise.

For instance, when capturing multiple data points for one or more items of interest, the system may recognize, pre-conversion, that there are a set number of items for which the system is capturing and combining relevant data (e.g., five thousand accounts, five million accounts, or the like). This may be referred to as a "magic" or set number of data points which should be respected before conversion can take place (e.g., resulting data set should likewise contain five thousand account rows, five million account rows, or the like). For instance, in some embodiments, post-capture, the amount of items or rows in a data table may not match the source data set or expected outcome for number of items. In this case, further review would be needed to determine where the discrepancy arises during data capture to determine if multiple data points are not being captured and compiled correctly in order to arrive at the same number of items of interest as provided by the source (e.g., the "magic" number of items should be five thousand, five million, or the like, wherein the item list comprises more than five thousand, or five million items, respectively, after data capture, therefore requiring review to determine where the discrepancy originates). Following the section owner review, the development stage completes, as shown at process step 206. The system then performs a pre-review validation and generates a conversion SQL table which is then passed for package preparation, as shown in block 207. The package is generated as a peer review package, including a semi-automated SQL conversion, as shown at block 208. The process then proceeds further, as shown by the process linkage indicator "A" included in both FIG. 2 and FIG. 3.

FIG. 3 depicts a process flow diagram 300 for utilizing system tools for peer review and data flow for downstream review package generation, in accordance with one embodiment of the present invention. The process proceeds to block 301, wherein peer review is initiated. It is understood that a peer reviewer may be a user within the system tasked to perform a redundant check for quality assurance before data conversion files are shared with downstream users, business contacts, vendors, or the like, in order to escalate and revert any conversion projects for quality assurance prior to validation. Preliminary conversion results for the peer review are provided via execution the semi-automated SQL conversion, and results are uploaded to the shared datastore for peer review, as shown by the dual query review process flows following block 302. If the peer review fails (e.g., a threshold number of data is unable to be converted, there is a mismatch in input and output data number, or the like), as shown at block 303, the proceeds reverts back to the section owner review 205, and the steps described in FIG. 2 may be repeated in order to remedy any identified issues. The results uploaded to the shared datastore are packaged compare results that comprise distilled data from a large amount of conversion detail data, according to the SQL conversion.

The resulting document includes data conversion definitions (e.g., definitions for how specific data fields have been converted, or the like), but may be programmed to only show a highlighted portion or summary of representative converted data for convenience of a peer reviewer (e.g., a review column may include a tally of successfully converted items, fields, or the like, a tally of potential mismatches or failures, or the like). A more detailed document containing conversion detail data and a full scope of converted data and underlying SQL relational database management code, Python script code, or the like, may be made available via an automatically generated hyperlink embedded within a packaged results document. In this way, the packaged comparison results may be shared with peers for certification in an automated and efficient manner. It is understood that the shared datastore may house various version of converted data, packaged review documents, and batch conversion process data for later review and analysis by one or more entities, users, or the like. Issues reported during peer review may be reviewed be the section owner and passed back or reported to package preparation 207 in order to resolve any reported issues. Once reported issues are resolved, the peer reviewer may run a validated SQL generation template macro function in order to validate an existing template, as shown in block 304. The validated template is then executed to generate a review package for downstream review, in a semi-automated fashion, as shown in block 305. The process then proceeds further, as shown by the process linkage indicator "B" included in both FIG. 3 and FIG. 4.

FIG. 4 depicts a process flow diagram 400 for utilizing system tools for downstream review and data flow for downstream review certification and validation, in accordance with one embodiment of the present invention. The process proceeds to block 401, wherein downstream review is initiated. Conversion results for downstream representative review are provided via execution the validated semi-automated SQL conversion, and results are uploaded to the shared datastore for review, as shown by the dual query review process flows following block 402. If the downstream review fails (e.g., downstream representative or reviewer finds an element of the review unsatisfactory, potentially problematic, or the like), as shown at block 403, the proceeds reverts back to the section owner review 205, and the steps described in FIG. 2 may be repeated in order to remedy any identified issues, request changes, or alert of potential problems. It is understood that the status of the review is continuously updated in the shared datastore such that the user accessing the shared datastore may easily identify the stage in the process for any particular conversion project, as well as any potential issues that may have been identified during the conversion or review processes. The results are uploaded to the shared datastore and are packaged as compare results that comprise distilled data from a large amount of conversion detail data, according to the SQL conversion (e.g., packaged results may be exported in the form of a widely accessible and easily viewable spreadsheet format, or the like, containing links to larger, more complex datasets reflecting the underlying data, data conversion definitions, and processes used during conversion). The resulting document includes data conversion definitions, but may be programmed to only show a highlighted portion of representative converted data for convenience of a the reviewer, much like the step described with regard to peer review.

A more detailed document containing conversion detail data and a full scope of converted data may be made available via an automatically generated hyperlink embedded within a packaged results document. In this way, the packaged comparison results may be shared with downstream users for certification in an automated and efficient manner. It is understood that the shared datastore may house various version of converted data, packaged review documents, and batch conversion process data for later review and analysis by one or more entities, users, or the like. Issues reported during downstream review may be reviewed be the section owner and passed back to package preparation 207 in order to resolve any reported issues. Once reported issues are resolved, a reviewer may run a validate SQL generation template macro function in order to generate a new validation an updated existing template. The updated template is then run to generate an updated review package for downstream review, in a semi-automated fashion. Once the packaged results pass review by the downstream users, as shown in block 404, the packaged results are considered certified. It is understood that packaged results may be certified on a field-by-field basis, and the downstream representatives are not required to certify an entire packaged result workbook. Instead, the downstream reviewers may review, certify, or fail each field and return the workbook to the shared datastore where the review results are recorded and tracked for further processing, if necessary. Certified packages may be executed as data conversion queries, which are then presented as results to downstream users for final production validation, as shown in block 405.

FIG. 5 depicts a high level process flow 500 for system tool utilization for bulk conversion, in accordance with embodiments of the present invention. The process begins at block 502, wherein the system receives a request from a user via a user device to initiate a new data conversion project. The system generates and stores a conversion project management data file for the conversion project on the shared datastore, wherein the shared datastore comprises a datastore accessible via remote access over network 101 from multiple users, entities, third party entities, downstream users, or the like, as shown in block 504. Next, as shown in block 506, the system receives source data for conversion (e.g., from one or more external entities, downstream users, customers, vendors, users, or the like) and generates a relational database conversion template based on the received source data and reconciliation of source data files. For instance, the system may utilize the data definition document (DDD) with the shared datastore information and data conversion validation (DCV) files contained in an Oracle database and pre-populate existing SQL templates with relevant data in order to provide a semi-automated process for conversion package creation.

Next, as shown in block 508, the system builds a relational database development framework and develops a field conversion template for peer review. The relational database development framework is used to generate one or more comparison documents, shadow tables, or the like, such that peer review can take place as a form of pre-review validation before results are uploaded to the shared datastore for further review by downstream users. Finally, after validation during peer review, the conversion and compare results are uploaded and shared datastore for downstream review and certification. In some embodiments, the packaged data or "data package" may comprise a spreadsheet file with one or more hyperlinks to relational database management conversion code and one or more data definitions.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein. In some embodiments, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A system for automation of bulk data conversion, the system comprising:
   at least one memory device with computer-readable program code stored thereon;
   at least one communication device;
   at least one processing device operatively coupled to the at least one memory device and the at least one communication device, wherein executing the computer-readable program code is configured to cause the at least one processing device to:
receive a request from a user via a user device to initiate a conversion project;
generate and store a conversion project data file for the conversion project on a shared datastore, wherein the shared datastore comprises a datastore accessible via remote access over a network;
receive source data for conversion;
generate a relational database conversion template based on the received source data;
execute the relational database conversion template to generate a peer review data package, wherein the peer review data package further comprises a shadow table, wherein the shadow table displays a system version of sourced versus converted data and a summary of discrepancies between source data and converted data;
generate a peer review data package result comprising field-by-field certification capacity allowing one or more downstream users to review, certify, or fail each field and return the peer review data package result as a workbook to the shared datastore;
upload the peer review data package to the shared datastore;
grant access to the peer review data package to one or more peer users;
revise the relational database conversion template based on input received from the one or more peer users;
execute a revised relational database conversion template to generate a converted data package; and
upload the converted data package for access by one or more downstream users.

2. The system of claim 1, wherein generating the relational database conversion template further comprises generating a pre-populated relational database management conversion script based on one or more fields contained in the source data.

3. The system of claim 1, wherein the source data further comprises data to be converted, a definition document defining one or more data fields or conversion rules, and a data conversion validation file.

4. The system of claim 1, wherein the converted data package further comprises a spreadsheet file summarizing the bulk data conversion.

5. The system of claim 1, wherein the converted data package further comprises a spreadsheet file with one or more hyperlinks to relational database management conversion code and one or more data definitions.

6. The system of claim 1, wherein the shared datastore is continuously updated to reflect the status of the conversion project.

7. A computer program product for automation of bulk data conversion, the computer program product comprising a non-transitory computer-readable storage medium having computer-executable instructions to:
receive a request from a user via a user device to initiate a conversion project;
generate and store a conversion project data file for the conversion project on a shared datastore, wherein the shared datastore comprises a datastore accessible via remote access over a network;
receive source data for conversion;
generate a relational database conversion template based on the received source data;
execute the relational database conversion template to generate a peer review data package, wherein the peer review data package further comprises a shadow table, wherein the shadow table displays a system version of sourced versus converted data and a summary of discrepancies between source data and converted data;
generate a peer review data package result comprising field-by-field certification capacity allowing one or more downstream users to review, certify, or fail each field and return the peer review data package result as a workbook to the shared datastore;
upload the peer review data package to the shared datastore;
grant access to the peer review data package to one or more peer users;
revise the relational database conversion template based on input received from the one or more peer users;
execute a revised relational database conversion template to generate a converted data package; and
upload the converted data package for access by one or more downstream users.

8. The computer program product of claim 7, wherein generating the relational database conversion template further comprises generating a pre-populated relational database management conversion script based on one or more fields contained in the source data.

9. The computer program product of claim 7, wherein the source data further comprises data to be converted, a definition document defining one or more data fields or conversion rules, and a data conversion validation file.

10. The computer program product of claim 7, wherein the converted data package further comprises a spreadsheet file summarizing the bulk data conversion.

11. The computer program product of claim 7, wherein the converted data package further comprises a spreadsheet file with one or more hyperlinks to relational database management conversion code and one or more data definitions.

12. The computer program product of claim 7, wherein the shared datastore is continuously updated to reflect the status of the conversion project.

13. A computer implemented method for automation of bulk data conversion, the computer implemented method comprising:
providing a computing system comprising a computer processing device and a non-transitory computer readable medium, where the non-transitory computer readable medium comprises configured computer program instruction code, such that when said instruction code is operated by said computer processing device, said computer processing device performs the following operations:
receiving a request from a user via a user device to initiate a conversion project;
generating and store a conversion project data file for the conversion project on a shared datastore, wherein the shared datastore comprises a datastore accessible via remote access over a network;
receiving source data for conversion;
generating a relational database conversion template based on the received source data;
executing the relational database conversion template to generate a peer review data package, wherein the peer review data package further comprises a shadow table, wherein the shadow table displays a system version of sourced versus converted data and a summary of discrepancies between source data and converted data;

generating a peer review data package result comprising field-by-field certification capacity allowing one or more downstream users to review, certify, or fail each field and return the peer review data package result as a workbook to the shared datastore;

uploading the peer review data package to the shared datastore;

granting access to the peer review data package to one or more peer users;

revising the relational database conversion template based on input received from the one or more peer users;

executing a revised relational database conversion template to generate a converted data package; and uploading the converted data package for access by one or more downstream users.

14. The computer implemented method of claim 13, wherein generating the relational database conversion template further comprises generating a pre-populated relational database management conversion script based on one or more fields contained in the source data.

15. The computer implemented method of claim 13, wherein the source data further comprises data to be converted, a definition document defining one or more data fields or conversion rules, and a data conversion validation file.

16. The computer implemented method of claim 13, wherein the converted data package further comprises a spreadsheet file with one or more hyperlinks to relational database management conversion code and one or more data definitions.

17. The computer implemented method of claim 13, wherein the shared datastore is continuously updated to reflect the status of the conversion project.

* * * * *